United States Patent [19]

Horiuchi et al.

[11] Patent Number: 5,771,255
[45] Date of Patent: Jun. 23, 1998

[54] LASER LIGHT GENERATOR

[75] Inventors: Yukio Horiuchi; Shu Yamamoto; Shigeyuki Akiba, all of Tokyo, Japan

[73] Assignee: Kokusai Denshin Denwa Kabushiki Kaisha, Tokyo, Japan

[21] Appl. No.: 799,119

[22] Filed: Feb. 11, 1997

[30] Foreign Application Priority Data

Feb. 22, 1996 [JP] Japan ................................... 8-035190

[51] Int. Cl.[6] ....................................................... H01S 3/13
[52] U.S. Cl. .................................. 372/31; 372/26; 372/38
[58] Field of Search ................................. 372/26, 31, 32, 372/29, 19, 38

[56] References Cited

U.S. PATENT DOCUMENTS

| 4,884,278 | 11/1989 | Nishimoto et al. | 372/26 |
| 5,227,908 | 7/1993 | Henmi | 372/26 |
| 5,317,577 | 5/1994 | Urakami et al. | 372/26 |
| 5,515,196 | 5/1996 | Kitajima et al. | 372/26 |

OTHER PUBLICATIONS

L. Eskildsen, et al., "Residual Amplitude Modulation Suppression Using Deeply Saturated Erbium–doped Fiber Amplifiers", IEEE Photon. Technol. Lett., vol. 7, No. 12, pp. 1516–1518, 1995.

*Primary Examiner*—Leon Scott, Jr.
*Attorney, Agent, or Firm*—Christie, Parker & Hale, LLP

[57] ABSTRACT

A laser light generator includes an adder 12 which adds an optical frequency modulation signal Sm onto a d.c. voltage for driving a laser diode 10 for continuous laser oscillation, and applies the sum signal to the laser diode 10 to drive it. An light output from the laser diode 10 is introduced to an optical intensity controller 14 that is controlled by a control signal prepared by adjusting the optical frequency modulation signal Sm both in phase and in amplitude by a phase adjusting circuit 16 and an amplitude adjusting circuit 18. The optical intensity controller 14 may be an electroabsorption modulator that changes its transmissivity in response to an output voltage of the circuit 18. Quantities of adjustment by the circuits 16 and 18 are determined so that fluctuation in transmissivity of the optical intensity controller 14 suppresses intensity fluctuation of the light output of the laser diode 10.

14 Claims, 13 Drawing Sheets

Fig.9(a) Optical Frequency Modulation Signal Sm
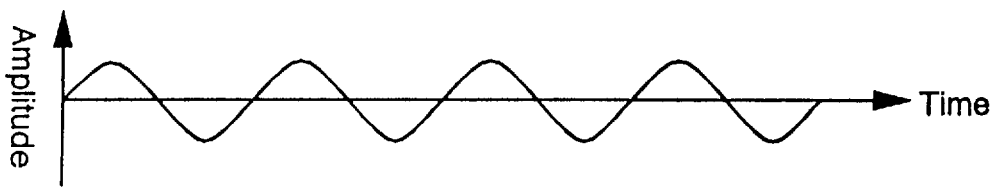
Fig.9(b) Loght output of LD 68
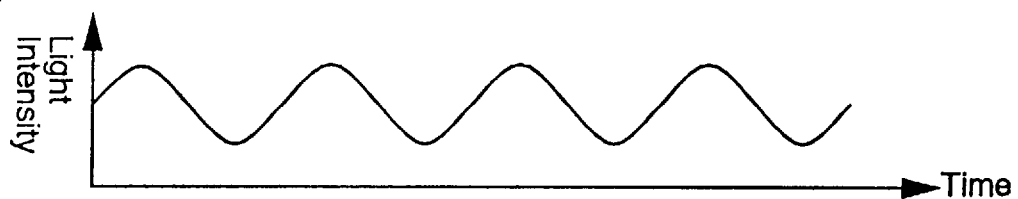
Fig.9(c) Transmissivity characteristics of EA Modulator 82
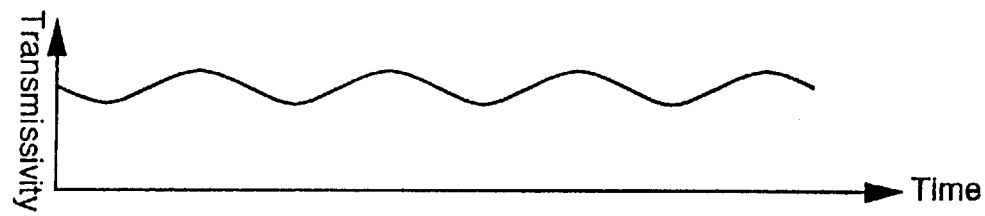
Fig.9(d) Light output of EA Modulator 82
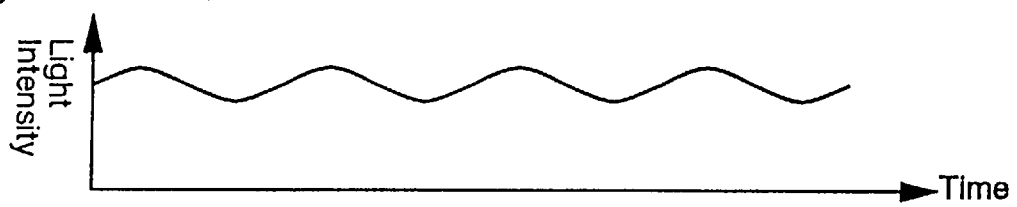
Fig.9(e) Correlation output of Multiplier 72

Fig.10(a) Optical Frequency Modulation Signal Sm
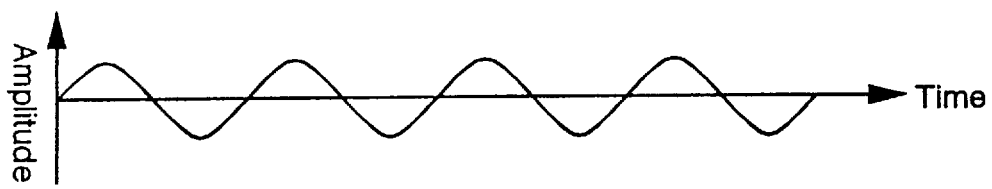
Fig.10(b) Loght output of LD 68
Fig.10(c) Transmissivity characteristics of EA Modulator 82
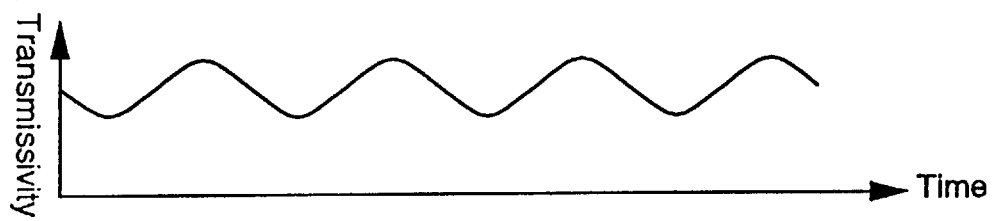
Fig.10(d) Light output of EA Modulator 82
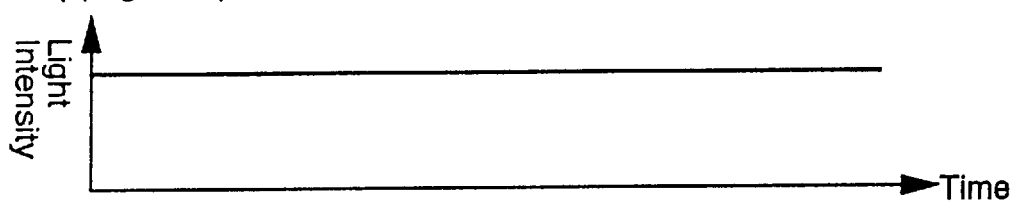
Fig.10(e) Correlation output of Multiplier 72
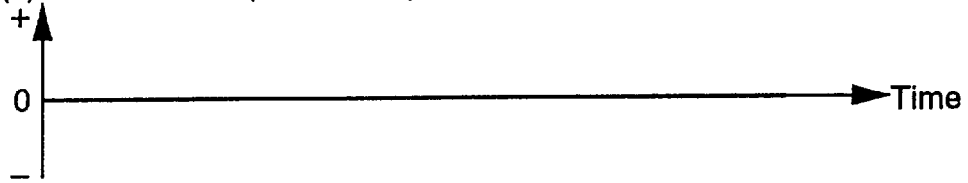

Fig. 11(a) Optical Frequency Modulation Signal Sm
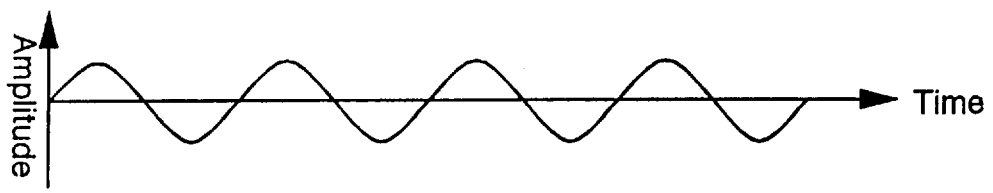
Fig. 11(b) Loght output of LD 68
Fig. 11(c) Transmissivity characteristics of EA Modulator 82
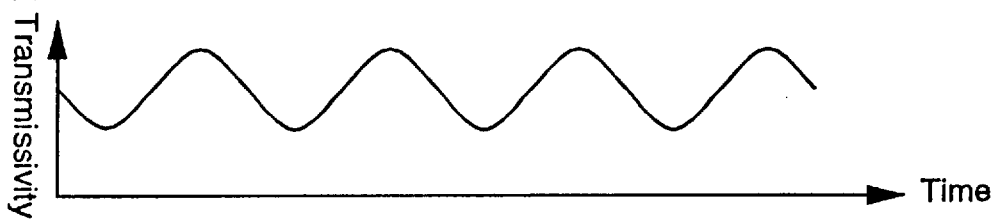
Fig. 11(d) Light output of EA Modulator 82
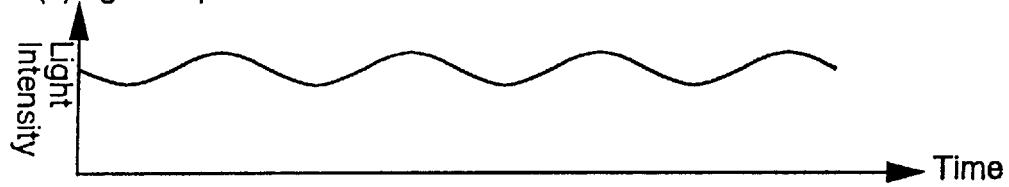
Fig. 11(e) Correlation output of Multiplier 72
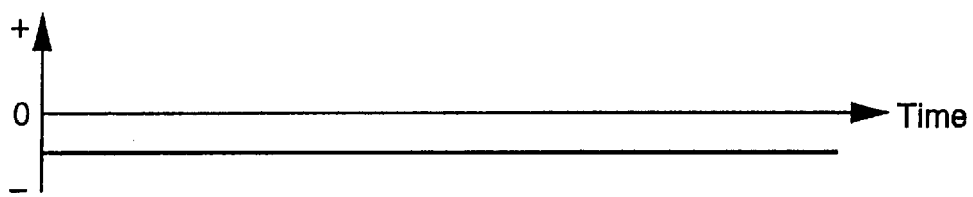

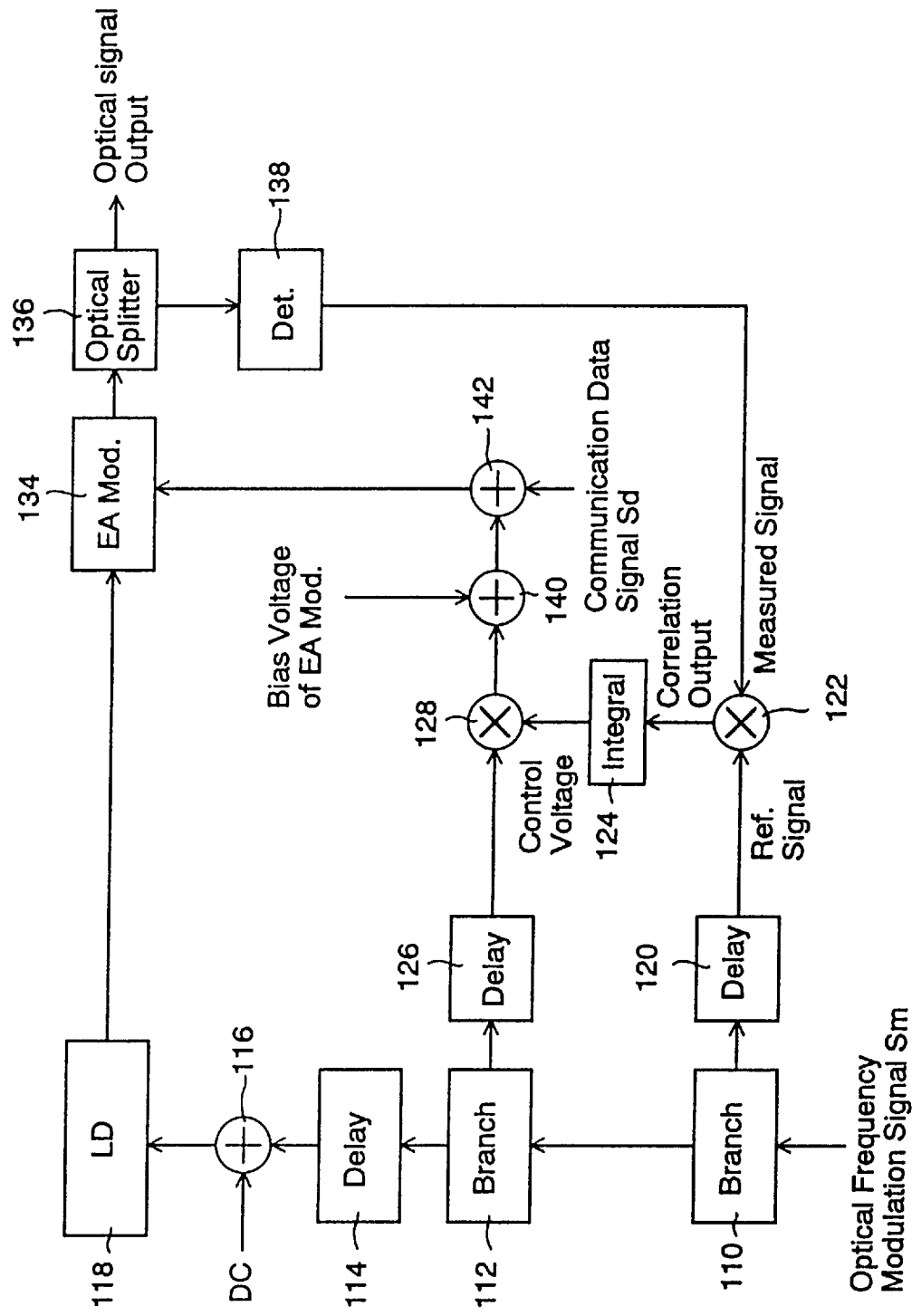

LASER LIGHT GENERATOR

BACKGROUND OF THE INVENTION

1. Field of the Invention

This invention relates to a laser light generator and, more particularly, to a device for generating an optical-frequency-modulated laser.

2. Related Art

In optical fiber transmission systems, more particularly in repeaterless transmission systems, it is desired to increase optical input power into optical fibers in order to increase the transmission distance (or the repeater distance in repeating transmission systems). However, high-power laser light increases deterioration in transmission characteristics of such systems due to stimulated Brillouin scattering (SBS). This disturbs a sufficient increase in input power to optical fibers. The threshold value of the input power that can prevent an adverse effect of stimulated Brillouin scattering in typical optical fibers is considered around 5 mW.

There is known that the threshold value can be increased by frequency-modulating a laser light (carrier wave) in the tone of a single frequency, for example. The simplest way is to slightly modulate the current injected into a semiconductor laser diode, which results in changing the refractive index in the resonance cavity of the semiconductor laser diode, and in changing the frequency of oscillated light in the semiconductor laser diode in response to a modulation signal contained in the injected current. If a large change in optical frequency is desired, the amplitude of the modulation signal superposed to the injected current must be increased.

This approach relying on fine modulation of injected current to the semiconductor laser diode invites intensity modulation in addition to optical frequency modulation, and the intensity-modulated components degrade transmission characteristics of the optical transmission system (directly, increase the transmission loss and the error rate of the system). It is taught that optical intensity-modulated components of approximately 42% are produced when fine modulation of injected current to a semiconductor laser diode is effected to obtain an optical spectral width of approximately 8 GHz (L. Eskildsen, et al., "Residual Amplitude Modulation Suppression Using Deeply Saturated Erbium-doped Fiber Amplifiers", IEEE Photon. Technol. Lett., vol.7, No.12, pp. 1516–1518, 1995). The eye pattern deteriorates as shown in FIG. 4(a) of this Literature.

The Literature also teaches a technology for suppressing such intensity-modulated components by using response characteristics of erbium-doped optical fiber amplifiers. That is, by effecting small modulation at frequencies of 5 kHz to 10 kHz while a DFB laser diode is driven for continuous laser oscillation, its output light is entered into a deeply saturated erbium-doped optical fiber amplifier. The erbium-doped optical fiber amplifier has a 3 dB cut-off frequency as high as 25 kHz. Intensity-modulated components in the range of 5 kHz to 10 kHz are suppressed by a slope portion of response characteristics of the erbium-doped optical fiber amplifier. Here, the amount of shift in optical frequency is approximately 8 GHz, and the optical power after optical amplification is approximately 200 mW. According to the Literature, transmission penalties of approximately 3.5 dB without suppression of intensity-modulated components could be improved to 0.2 thorough 1.0 dB by suppression of intensity components.

However, the structure taught by the Literature results in restricting the modulation frequency of the laser diode below 10 kHz, or below 25 kHz at maximum. Higher frequencies are considered preferable to reliably compensate degradation of transmission characteristics of optical transmission systems caused by stimulated Brillouin scattering, and the technology taught by the Literature cannot cope with such demands.

Moreover, the same prior art needs excitation optical sources as many as six pumps (PUMP 1 through PUMP 6 in FIG. 1 of the Literature) because the erbium-doped optical fiber amplifiers are used in substantially saturated conditions. This is uneconomical because the saturated optical output powers used there are as high as 200 mW or more that are not required in many typical cases.

OBJECT AND SUMMARY OF THE INVENTION

It is therefore an object of the invention to provide a laser light generator for generating a laser with no or less fluctuation in optical intensity.

A further object of the invention is to provide a laser light generator for generating a data-modulated optical signal with reduced fluctuation in optical intensity for use in optical communication or measurement.

According to the invention, the light output from a laser source which is modulated both in optical frequency and in intensity by an optical frequency modulation signal Sm, is introduced to an optical intensity fluctuation suppressing means using electroabsorption optical modulating means or optical amplifying means. The gain or attenuation factor of the optical intensity fluctuation suppressing means is controlled substantially by the optical frequency modulation signal Sm to suppress intensity fluctuation of the light output from the laser source. In this manner, intensity fluctuation in the light output from the laser source can be suppressed efficiently, which results in producing optical carrier waves that are modulated in optical frequency and include no or less fluctuation in optical intensity. The light output signal thus obtained is useful for communication and for measurement.

The optical intensity fluctuation suppressing means may comprise phase/amplitude adjusting means and optical intensity control means. Then, by adjusting the optical frequency modulation signal Sm at least in phase or in amplitude and by controlling the intensity of the light output from the laser source in accordance with a signal resulting from the adjustment, fluctuation in optical intensity can be suppressed more accurately.

The optical intensity fluctuation suppressing means may further include residual fluctuation detecting means and correlation detecting means so as to detect residual fluctuation after the intensity fluctuation suppression and to detect correlation with the optical frequency modulation signal Sm such that the amount of amplitude adjustment by the phase/amplitude adjusting means be controlled in accordance with the correlation rate obtained. Then, residual fluctuation after the intensity fluctuation suppression can be automatically minimized even under fluctuation in amplitude of the optical frequency modulation signal Sm, for example.

The optical intensity control means may be optical amplifier means controllable in amplification gain by an external control signal or light transmission means controllable in attenuation factor by an external control signal. More specifically, the optical intensity control means may be appropriate one of an electroabsorption type optical modulator, Mach-Zehnder interferometer-type modulator, optical filter, optical attenuator, semiconductor laser amplifier, optical fiber amplifier, and so forth.

According to another aspect of the invention, the laser source is adjusted in intensity by using a composite signal which is obtained by multiplying or adding a signal obtained from an optical frequency modulation signal Sm for optical frequency-modulating the laser source by or to a data signal Sd. Then, an optical carrier wave modulated in optical frequency but having less fluctuation in optical intensity can be obtained. At the same time, since a common element modulates it by the data signal Sd, a qualified optical signal can be obtained. Since a common optical modulating means may be used both for suppression of intensity fluctuation and for modulation by the data signal Sd, the device is economical.

BRIEF DESCRIPTION OF THE DRAWINGS

FIG. 9 is diagrams showing waveforms that appear upon insufficient suppression of intensity fluctuation in the embodiment shown in FIG. 8;

FIG. 10 is diagrams showing waveforms that appear upon optimum control in the embodiment shown in FIG. 8;

FIG. 11 is diagrams showing waveforms that appear upon excessive suppression in the embodiment shown in FIG. 8;

FIG. 13 is a block diagram showing a general construction of a sixth embodiment of the invention.

DESCRIPTION OF THE PREFERRED EMBODIMENTS

Embodiments of the invention are described below in detail with reference to the drawings.

Figure 1:
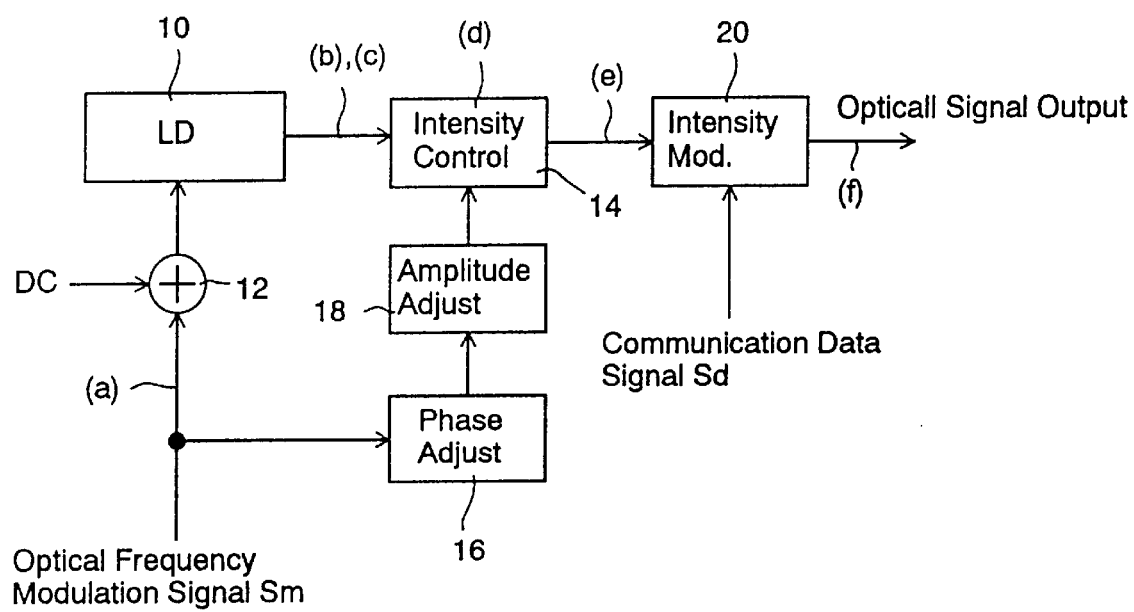
FIG. 1 is a block diagram showing a general construction of an embodiment of the invention.
Figure 2:
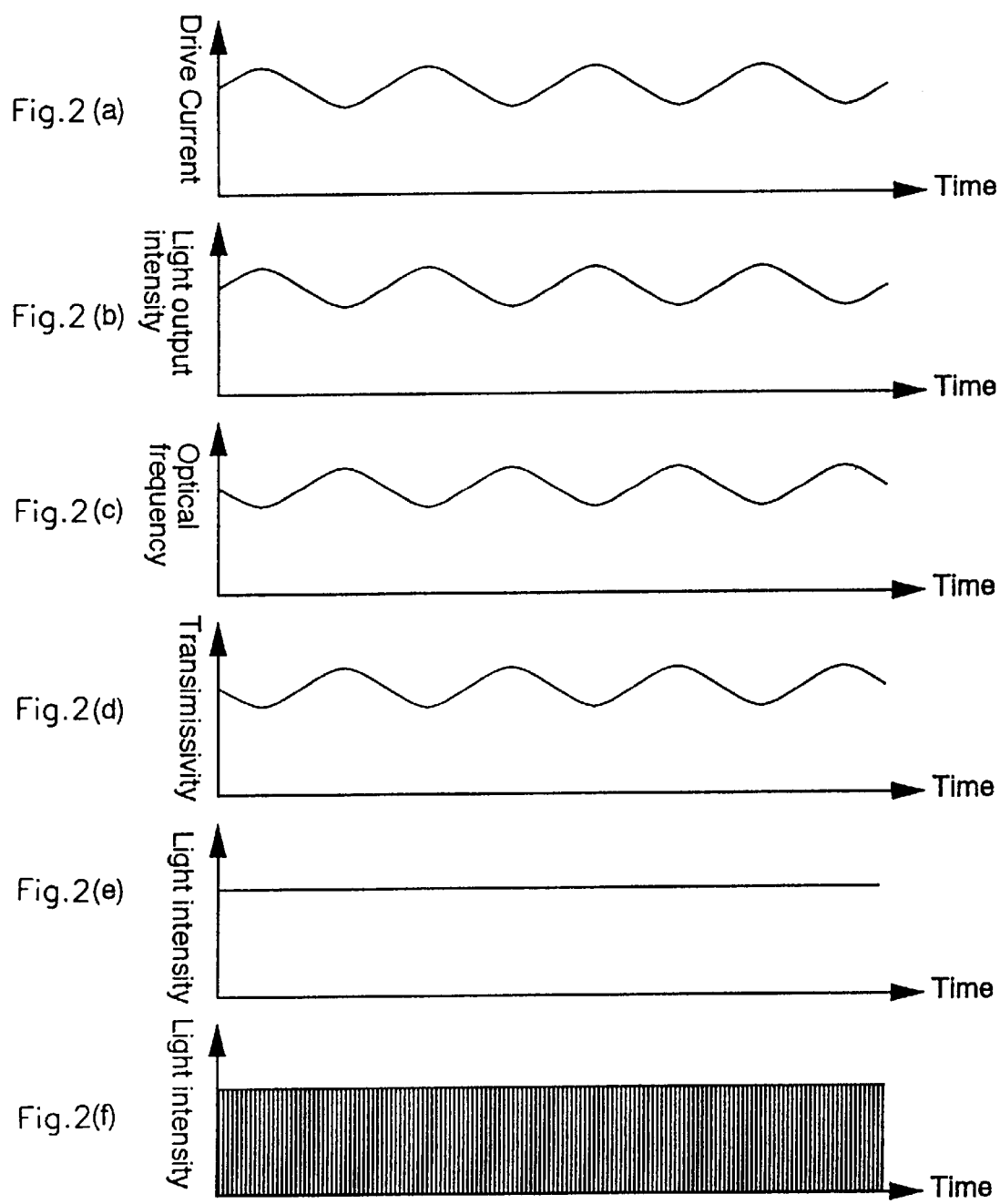
FIG. 2 is diagrams showing waveforms in different portions of the embodiment shown in FIG. 1.

FIG. 1 is a block diagram of a general construction of a device embodying the invention, and FIG. 2 shows waveforms at different portions in the device. Numeral 10 denotes a semiconductor laser diode. An adder 12 superposes a small optical frequency modulation signal (sinusoidal a.c. signal) Sm to a predetermined d.c. bias for continuously laser oscillating the laser diode 10, and applies the result to the laser diode 10 as the dive current. The frequency of the optical frequency modulation signal Sm ranges from d.c.or several hertz to several megahertz when it is used for measurement, but ranges from several kilohertz to several megahertz when it is used for SBS suppression. FIG. 2(a) shows the waveform of a drive current for the laser diode 10. The laser diode 10 is driven by the drive current to generate a laser light modulated both in intensity and in optical frequency. FIG. 2(b) shows the waveform of the intensity fluctuation of the light output from the laser diode 10, and FIG. 2(c) shows the optical frequency fluctuation waveform of the light output from the laser diode 10.

Figure 3:
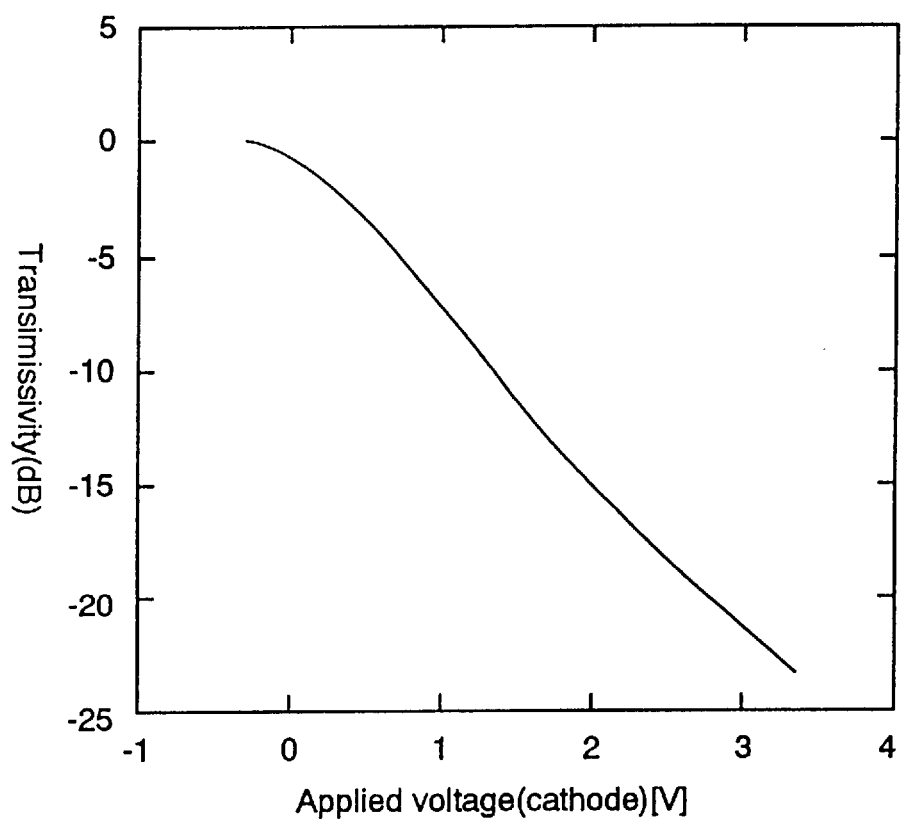
FIG. 3 is a characteristic diagram of an electroabsorption optical modulator.

The light output from the laser diode 10 is applied to an optical intensity controller 14. The optical intensity controller 14 is an optical element whose input light intensity is electrically externally controllable, namely, an optical element such as semiconductor laser amplifier or optical fiber amplifier whose gain can be electrically controlled externally, or an optical element such as electroabsorption optical modulator, Mach-Zehnder interferometer-type modulator or optical attenuator whose attenuation factor can be electrically controlled externally. In case of an optical fiber amplifier, its gain of amplification is controlled by adjusting the amount of pump light. If an optical filter is used, its attenuation factor may be controlled by using a slope portion of its transmissivity wavelength characteristics and by externally changing the center wavelength. This embodiment uses an electroabsorption optical modulator as the optical intensity controller 14 because it copes with wider frequencies and is commonly usable for modulation by a data signal Sd as explained later. FIG. 3 shows characteristics of the electroabsorption optical modulator, taking the voltage applied to the cathode (control voltage) on the horizontal axis and the transmissivity (logarithm) on the vertical axis. As shown in FIG. 3, the transmissivity of the electroabsorption optical modulator exponentially varies with control voltage.

A phase adjusting circuit 16 adjusts the phase of the optical frequency modulation signal Sm and applies it to an amplitude adjusting circuit 18. The phase adjusting circuit 16 is a so-called delay circuit interposed to match the intensity fluctuation of the light output of the laser diode 10 in phase with effects of intensity fluctuation suppression by the optical intensity controller 14. The amplitude adjusting circuit 18 adjusts the amplitude of the output from the phase adjusting circuit 16 (and inverts the phase, if necessary), simultaneously adds a predetermined bias, and then applies the resulting signal as a control signal to the optical intensity controller 14.

Due to the output signal from the amplitude adjusting circuit 18, the transmissivity of the optical intensity controller 14 fluctuates synchronously with the optical frequency modulation signal Sm with an amplitude responsive to the output voltage of the amplitude adjusting circuit 18 so as to cancel the intensity fluctuation of the output laser light of the laser diode 10 as shown in FIG. 2(d). In other words, the amplitude adjusting circuit 18 adjusts the amplitude of the output signal from the phase adjusting circuit 16 such that the transmission characteristics of the optical intensity controller 14 varies to cancel the intensity fluctuation of the output laser light from the laser diode 10.

FIG. 2(e) shows intensity fluctuation of the light output from the optical intensity controller 14. The optical intensity controller 14 reduces the intensity fluctuation components of the light output from the laser diode 10 to substantially zero, and the intensity of light output from the optical intensity controller 14 becomes substantially constant with time as shown in FIG. 2(e).

An light intensity modulator 20 ON/OFF-modulates the light output from the optical intensity controller 14 in response to the communication data signal Sd. The frequency of the communication data signal Sd is hundreds of megahertz or more. Although the data signal Sd is intended for use in communication, it can of course be a data signal for measurement, as well, when it is used for measurement of transmission characteristics of optical transmission systems, etc. The optical intensity modulator 20 is, for example, an electroabsorption modulator. The light output from the optical intensity modulator 20 has the waveform as shown in FIG. 2(f).

Figure 4:
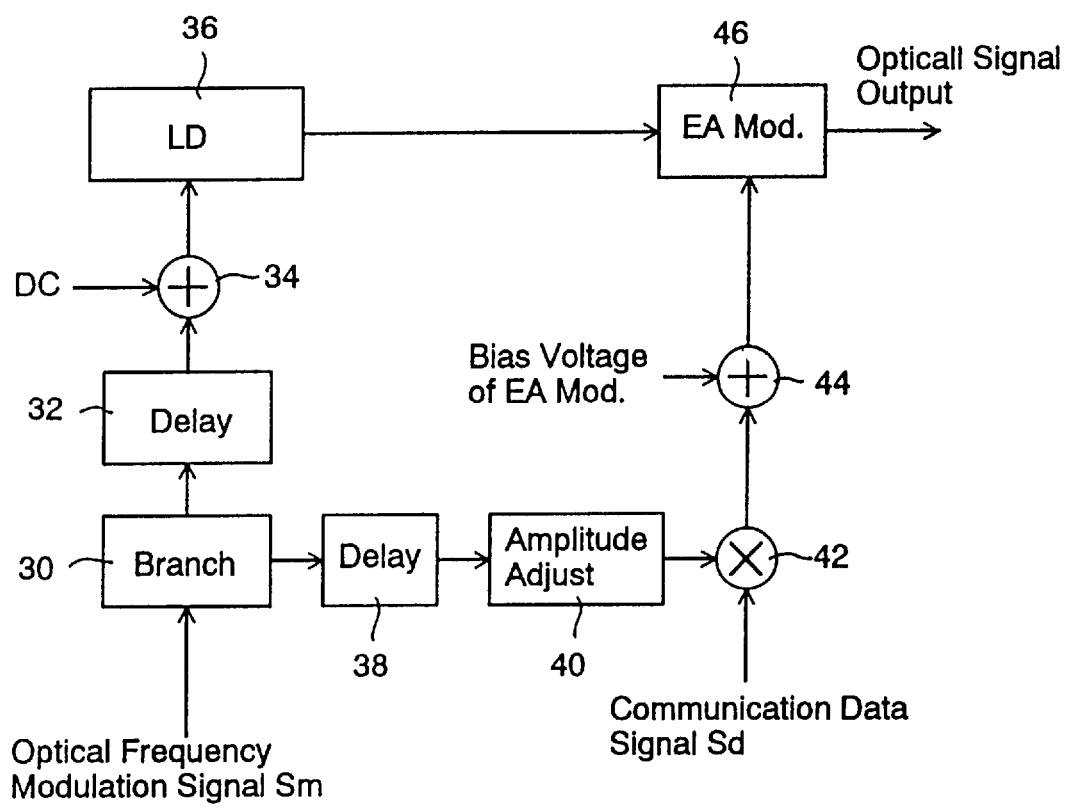
FIG. 4 is a block diagram showing a general construction of a second embodiment of the invention.

Next explained is an embodiment using a single optical modulator both for suppression of intensity modulated components caused by optical frequency modulation and for modulation by the communication data signal Sd. FIG. 4 is a block diagram of a general construction of the embodiment.

In FIG. 4, numeral 30 denotes a branch circuit that branches the optical frequency modulation signal Sm into two. One of the outputs from the branch circuit 30 is applied to an adder 34 via a delay circuit 32 with a predetermined amount of delay. The adder 34 makes addition of output from the delay circuit 32 (optical frequency modulation signal Sm) to a d.c. voltage necessary for continuous laser oscillation, and applies the resulting signal as a drive current to a semiconductor laser diode 36. The other output from the branch circuit 30 is applied to an amplitude adjusting circuit 40 via a delay circuit 38 with a predetermined amount of delay. The signal supplied from the branch circuit 30 to the delay circuit 32 or 38 is the optical frequency modulation signal Sm or its phase-inverted equivalent. Whether the signal is phase-inverted or not depends on whichever is preferred to suppress intensity fluctuation components of light output of the laser diode 36.

The amplitude adjusting circuit 40 is a gain variable circuit using a variable resistor and operational amplifier. The amplitude adjusting circuit 40 adjusts the gain of the output signal from the delay circuit 38 and delivers its output to one of inputs of a multiplier 42. The communication data signal Sd is supplied to the other input of the multiplier 42. The multiplier 42 multiplies the communication data signal Sd by the output from the gain adjusting circuit 40 (an amplitude-adjusted signal of the phase-adjusted optical frequency modulation signal Sm), and applies the result of the multiplication to an adder 44. That is, the multiplier 42 functions as an amplitude modulator circuit. The communication data signal Sd is a voltage signal with two values in which +Va (volt) indicates "1" and -Va (volt) indicates "0".

The adder 44 adds a predetermined d.c. bias to the output from the multiplier 42, and applies the resulting signal, as a control voltage, to a control terminal (cathode) of an electroabsorption modulator 46 which is also supplied with light output from the semiconductor laser diode 36. The electroabsorption modulator 46 changes in transmissivity in response to the output voltage from the adder 44, and thus modulates the intensity of the light output of the laser diode 36 in accordance with the output voltage of the adder 44.

Figure 5:
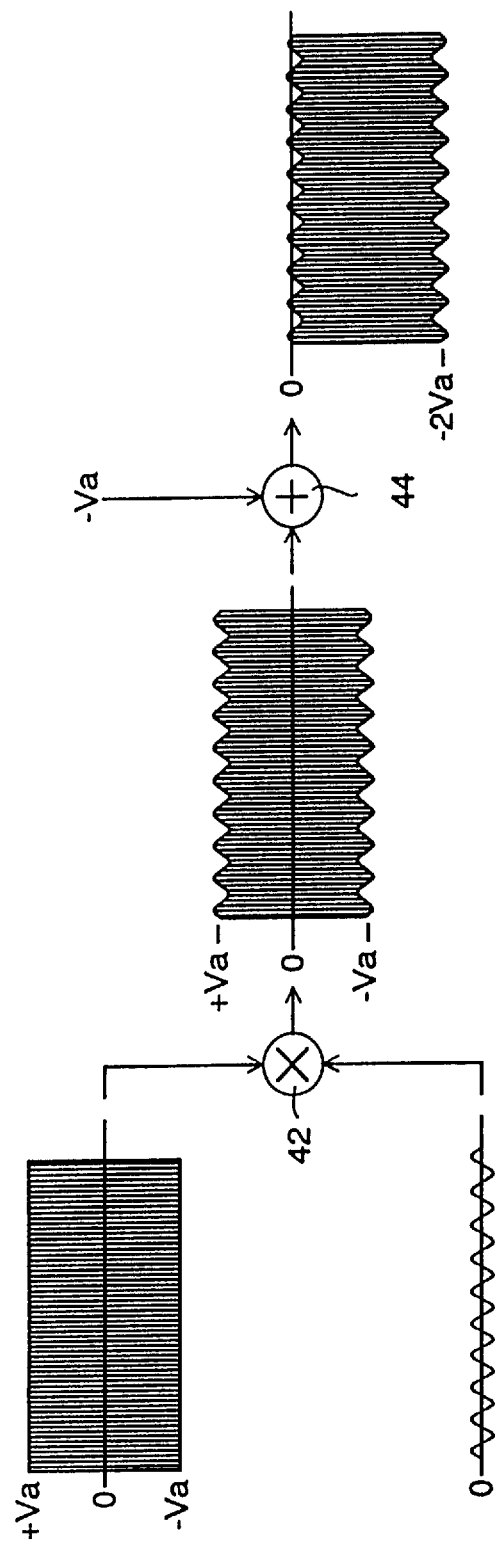
FIG. 5 is a diagram showing waveforms of an optical frequency modulation signal Sm, communication data signal Sd, output from a multiplier 42 and output from an adder 44.

The bias value added to the adder 44 is chosen such that all or substantially all of output signals from the multiplier 42 exhibit one of the opposite polarities (for example, negative polarity). The bias value added by the adder 44 may be, for example, -Va (volt). The amplitude 2 Va of the communication data signal Sd is set to a voltage that reduces the transmissivity of the electroabsorption modulator 46 to substantially zero. Waveforms of the optical frequency modulation signal Sm, communication data signal Sd and outputs from the multiplier 42 and the adder 44 are shown in FIG. 5, and input/output characteristics of the electroabsorption modulator 46 are shown in FIG. 6.

Figure 6:
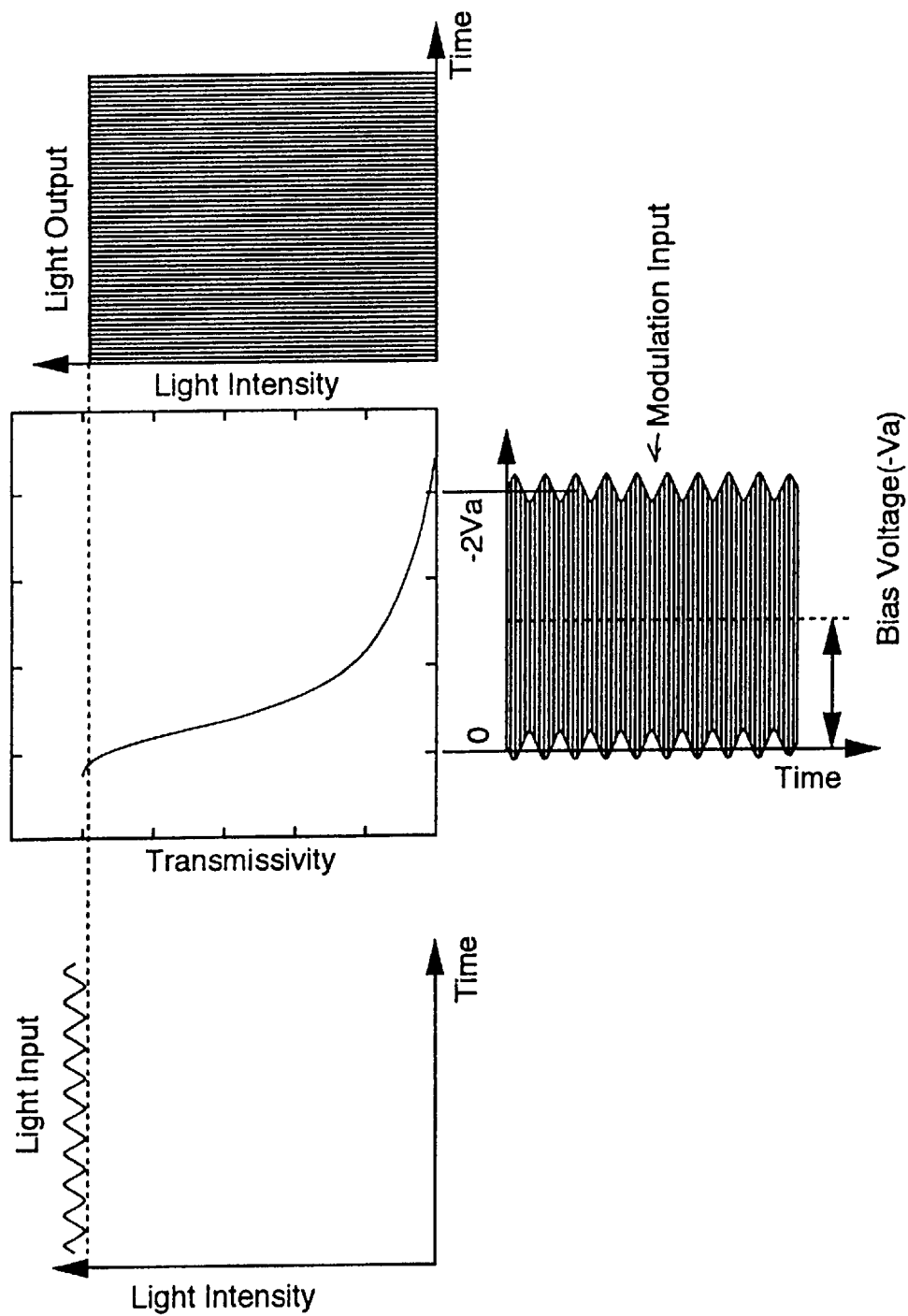
FIG. 6 is a diagram showing input/output characteristics of an electroabsorption optical modulator 46.

As understood from FIG. 6, fluctuation in output voltage of the adder 44 around -Va (volt) (in particular, the fluctuation synchronous with the optical frequency modulation signal Sm) causes only a small fluctuation in the transmissivity of the electroabsorption modulator 46 at a portion where the transmissivity is sufficiently low, and therefore, its affection to the light output of the laser diode 36 is very small. In contrast, when the output voltage of the adder 44 is around 0 volt, the transmissivity of the electroabsorption modulator 46 is high and varies largely, and therefore, fluctuation in the output voltage of the adder 44 around 0 volt largely affects the light output of the laser diode 36. More specifically, intensity modulation components contained in the light output from the laser diode 36 are suppressed due to fluctuation in transmissivity of the electroabsorption optical modulator 46 caused by intensity fluctuation of the optical frequency modulation signal Sm. At the same time, d.c. components of the light output of the laser diode 36 are intensity-modulated by components corresponding to the communication data signal Sd contained in the output from the adder 44.

In this manner, the light output from the electroabsorption modulator 46 is ON/OFF-modulated with the communication data signal Sd, and the intensity modulation components having been contained in the light output of the laser diode 36 by optical frequency modulation by the optical frequency modulation signal Sm is well-suppressed. Thus, a constant and stable extinction ratio can be obtained. In an experiment, intensity modulation components contained in a light output from the laser diode 36 could be suppressed to 1/10. Even this order of suppression sufficiently improves the transmission characteristics of the optical transmission system.

Quantities of delay of the delay circuits 32, 38 and quantities of amplitude adjustment in the amplitude adjusting circuit 40 are previously adjusted in response to the optical frequency modulation signal Sm used, so as to maximize the intensity fluctuation suppression effect in the electroabsorption modulator 46. Apparently, it is sufficient to use only one of the delay circuits 32, 38 by considering the relations of the timing of intensity fluctuation suppression in the electroabsorption modulator 46 relative to the phase of intensity fluctuation of the light output of the laser diode 36.

Figure 7:
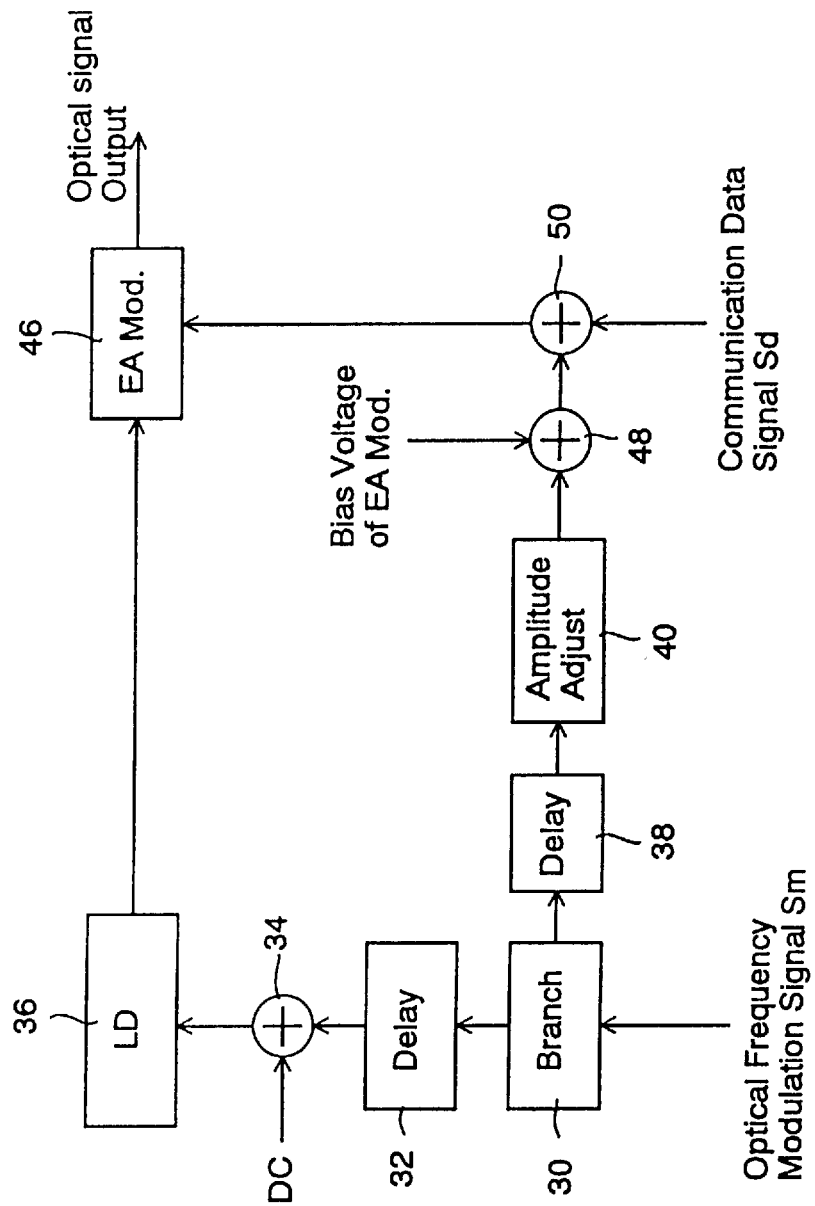
FIG. 7 is a block diagram showing a general construction of a third embodiment modified from the embodiment shown in FIG. 4.

Although the embodiment shown in FIG. 4 employs amplitude modulation of the communication data signal Sd, using a phase-and amplitude-modulated signal of the optical frequency modulation signal Sm, the same effects can be obtained by adding both signals. That is, an adder may be used instead of the multiplier 42. FIG. 7 is a block diagram showing a general construction of another embodiment modified in this respect. Elements in FIG. 7 which are the same as or equivalent to those in FIG. 4 are labeled with common reference numerals.

An adder 48 adds a bias voltage (for example, Va (volt)), that determines the operative point of the electroabsorption modulator 46, to an output voltage of the amplitude adjusting circuit 40. An adder 50 adds the communication data signal Sd to the output voltage of the adder 48. The adder 50 applies its output to the control terminal (cathode) of the electroabsorption modulator 46. Apparently, the bias voltage may be added after the communication data signal Sd is added to the amplitude-adjusted optical frequency modulation signal Sm. Also in the construction shown in FIG. 7, the electroabsorption modulator 46 functions in exactly the same manner as that in the construction of FIG. 4, and its light output has the form ON/OFF-modulated by the communication data signal Sd and suppressing intensity modulation components having been contained in the light output of the laser diode 36 by optical frequency modulation by the optical frequency modulation signal Sm.

The transmission characteristics of the electroabsorption modulator 46 are significantly nonlinear as shown in FIG. 3. Taking it into consideration, the embodiment shown in FIG. 7 may be modified to include a converter circuit that converts the output of the adder 48, for example, so as to compensate the nonlinear transmission characteristics of the electroabsorption modulator 46 before applying it to the adder 50. The use of the converter circuit promises more effective intensity fluctuation suppression in the electroabsorption modulator 46.

Although the embodiments shown in FIGS. 1, 4 and 7 are configured to suppress intensity fluctuation of the light output of the semiconductor laser diode 10 or 36 by using the optical frequency modulation signal Sm, intensity fluctuation components of the light output from the semiconductor laser diode 10 or 36 can be detected and extracted by a photo diode or other appropriate means to use its output instead of the optical frequency modulation signal Sm. This approach is useful when two laser outputs can be obtained from the laser diode 10 or 36, and has the advantage that the ratio of intensity fluctuation of the laser light relative to the optical frequency modulation signal Sm can be taken into consideration. Also such construction substantially uses the optical frequency modulation signal Sm to suppress fluctuation in optical intensity.

Figure 8:
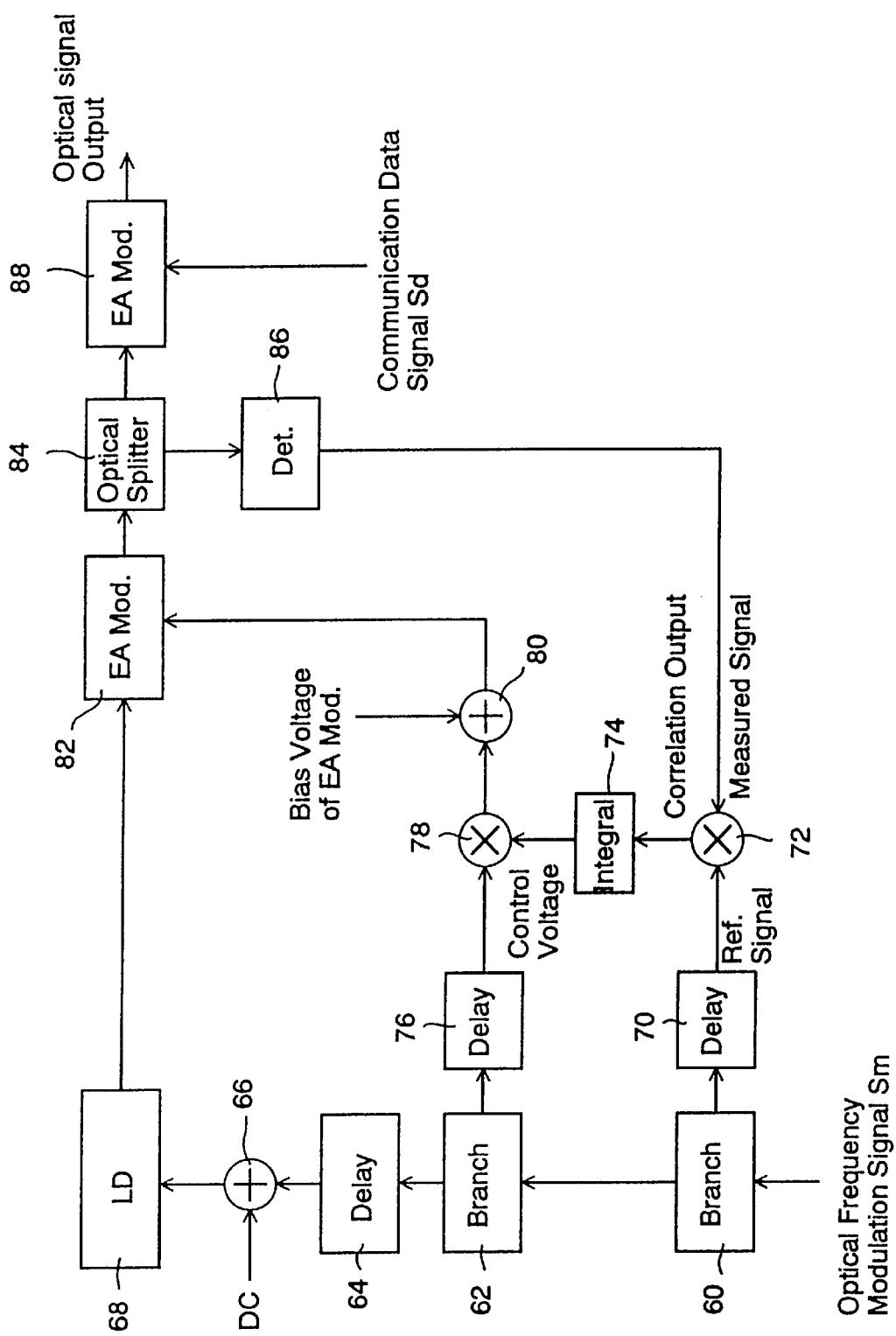
FIG. 8 is a block diagram showing a general construction of a fourth embodiment of the invention.

Next explained is a further embodiment for automatically minimizing residual fluctuation after intensity fluctuation suppression whenever the amplitude of the optical frequency modulation signal Sm may be fluctuated. FIG. 8 is a block diagram showing a general construction of the embodiment.

In FIG. 8, the optical frequency modulation signal Sm is divided into two by a branch circuit 60, and one of outputs from the branch circuit 60 is divided again into two by a branch circuit 62. One of output of the branch circuit 62 is applied to an adder 66 through a delay circuit 64 having a predetermined amount of delay, and the other output is applied to a delay circuit 76. The adder 66 is supplied with a d.c. voltage for causing continuous laser oscillation of a semiconductor laser diode 68, and adds the output voltage of the delay circuit 64 to the d.c. voltage. The adder 66 applies its output current to the semiconductor laser diode 68 to drive it. As a result, the semiconductor laser diode 68 is modulated both in optical frequency and in intensity by the optical frequency modulation signal Sm during continuous laser oscillation.

The other output of the branch circuit 60 is applied to one of inputs of a multiplier 72 through a delay circuit 70 having a predetermined amount of delay. The multiplier 72 is also supplied to the other input with a signal that indicates residual intensity fluctuation components after suppression of intensity fluctuation of the light output from the semiconductor laser diode 68 (specifically, an output from an optical detector 86 explained later). Thus, the multiplier 72 multiplies both inputs and detects correlation between the inputs. That is, the output of the multiplier 72 represents the correlation between the optical frequency modulation signal Sm and the residual components after intensity fluctuation suppression, and the multiplier 72 thus functions as a correlation detector. That is, the magnitude of the correlation output signal from the multiplier 72 indicates the quantity of the residual intensity fluctuation components, and the polarity indicates the direction of excessive suppression or insufficient suppression of the intensity fluctuation.

Signals supplied from the branch circuits 60, 62 to the delay circuits 70, 76, respectively, are inverted in phase from signals input to the branch circuits 60, 62 if necessarily.

An integrating circuit 74 integrates the output of the multiplier 72, and applies its output to a multiplication factor control terminal of a multiplier 78. Fluctuation of the correlation rate (output of the multiplier 72) is smoothed and integrated by the integrating circuit 74. Also applied to the multiplier 78 is the other output of the branch circuit 62 via a delay circuit 76 having a predetermined amount of delay. The multiplier 78 multiplies the output of the delay circuit 76 (a signal delayed from the optical frequency modulation signal Sm by the amount of delay of the delay circuit 76) by a factor of a magnitude determined by the voltage and the polarity of the output from the integrating circuit 74. More specifically, the multiplier 78 multiplies the output of the delay circuit 76 by a larger multiplication factor if the output voltage of the integrating circuit 74 is positive and large, or by a smaller multiplication factor if the output voltage of the integrating circuit 74 is negative and large. The multiplier 78 functions as amplitude adjusting means, and the integrating circuit 74 functions as amplitude control means for controlling the amplitude adjusting amount of the amplitude adjusting means (multiplier 78).

The multiplier 78 applies its output to an adder 80 which is also supplied with a bias voltage that determines the operative point of an electroabsorption modulator 82. The adder 80 adds the output of the multiplier 78 to the bias voltage, and applies its output to a control terminal (cathode) of the electroabsorption modulator 82. In this embodiment, since the electroabsorption modulator 82 is used for the purpose of suppressing intensity fluctuation of the light output of the semiconductor laser diode 68, the bias voltage added by the adder 80 may be zero volt.

The transmissivity of the electroabsorption modulator 82 thus varies to cancel intensity fluctuation of the light output of the laser diode 68. The amplitude of the fluctuation in transmissivity depends on the residual amount after intensity fluctuation suppression (specifically, output of the multiplier 72), and is controlled in the direction reducing the residual amount after intensity fluctuation suppression. The output signal of the integrating circuit 74 converges to a level where the correlation signal (output of the multiplier 72) becomes zero, that is, the residual intensity components are minimized. This embodiment is the same as the embodiment of FIG. 4 in that amounts of delay of the delay circuits 64 and 76 are previously determined so that the fluctuation in transmissivity of the electroabsorption modulator 82 takes a phase that cancels intensity fluctuation of the light output from the semiconductor laser diode 68. It will be apparent that at least one of the delay circuits 64, 70, 76 can be omitted. An optical splitter 84 splits the light output of the electroabsorption modulator 82 into two, and applies one of them to an optical detector 86 and the other to an electroabsorption modulator 88. The optical detector 86 converts an optical signal from the optical splitter 84 (optical signal output from the electroabsorption modulator 82) into an electric signal. The electric signal output from the optical detector 86 reflects the residual amount of intensity fluctuation suppression of the light output of the semiconductor laser diode 68 by the electroabsorption modulator 82. The output of the optical detector 86 is applied to the multiplier 72 and used there for detecting correlation with the optical frequency modulation signal Sm as explained above. The amount of delay of the delay circuit 70 is previously determined to match the output of the optical detector 86 in phase with the output of the delay circuit 70.

FIG. 9, FIG. 10 and FIG. 11 show waveforms at different portions in the construction shown in FIG. 8. Among these figures, FIG. 9 shows those resulting from insufficient intensity fluctuation suppression, FIG. 10 shows those obtained by optimum control, and FIG. 11 shows those by excessive suppression. In these figures, diagrams labeled (a) show those of the optical frequency modulation signal Sm, diagrams labeled (b) show those of the light output intensity of the semiconductor laser diode 68, diagrams labeled (c) show those of the transmission characteristics of the electroabsorption modulator 82, diagrams labeled (d) show those of the light output of the electroabsorption modulator 82, and diagrams labeled (e) show those of the correlation output of the multiplier 72.

When the effect of intensity fluctuation suppression by the electroabsorption modulator 82, for example, is small, waveforms appear as shown in FIG. 9, where the light output from the electroabsorption modulator 82 still contains intensity fluctuation of the same phase as the intensity fluctuation of the light output from the laser diode 68. Therefore, the output of the optical detector 86 contains signal components having the same phase as the optical frequency modulation signal Sm and having an amplitude corresponding to the residual amount of intensity fluctuation, and the correlation output of the multiplier 72 exhibits the positive voltage value responsive to the residual amount of intensity fluctuation as shown in FIG. 9(e). As a result, the output voltage of the integrating circuit 74 increases in the positive direction, and the multiplier 78 multiplies the output of the delay circuit 76 by a large factor. As the amplitude of the output from the multiplier 78 becomes large, the amplitude of fluctuation in transmissivity of the electroabsorption modulator 82 also becomes large, and this results in stronger suppression of intensity fluctuation of the light output from the semiconductor laser diode 68. In this manner, the electroabsorption modulator 82 is controlled to decrease the intensity fluctuation remaining in the light output from the electroabsorption modulator 82, that is, toward the condition shown in FIG. 10.

In contrast, when the effect of intensity fluctuation suppression by the electroabsorption modulator 82 is excessive, waveforms appear as shown in FIG. 11 where the light output of the electroabsorption modulator 82 still contains intensity fluctuation which is opposite in phase from the intensity fluctuation of the light output from the semiconductor laser diode 68. Therefore, the output of the optical detector 86 contains intensity fluctuation signal components that are opposite in phase from the optical frequency modulation signal Sm and have an amplitude responsive to the residual amount of intensity fluctuation, and the correlation output of the multiplier 72 exhibits a negative value of the magnitude corresponding to the residual amount of intensity fluctuation as shown in FIG. 11(e). The multiplier 78 multiplies the output of the delay circuit 76 by a factor smaller than the optimum condition in response to the output of the integrating circuit 74. As a result, the amplitude of the fluctuation in transmissivity of the electroabsorption optical modulator 82 becomes small, and the effect of intensity fluctuation suppression of the electroabsorption modulator 82 that was excessive is diminished. In this manner, even under the excessively controlled condition shown in FIG. 11, the electroabsorption modulator 82 is controlled to decrease intensity fluctuation residual in its light output, that is, toward the condition shown in FIG. 10.

Thus, the electroabsorption modulator 82 is controlled by the above-explained control loop to minimize intensity fluctuation of the light output from the semiconductor laser diode 68, and the light output of the electroabsorption modulator 82 becomes substantially constant relative to the time as shown in FIG. 10(d).

The control terminal (cathode) of the electroabsorption modulator 88 is supplied with the communication data signal Sd, and the electroabsorption modulator 88 modulates the light signal from the optical splitter 84 with the communication data signal Sd.

Although the embodiment shown in FIG. 8 uses the optical frequency modulation signal Sm itself as the reference signal for correlation detection by the multiplier 72, intensity fluctuation components in the light output from the semiconductor laser diode 68, which can be detected and extracted by an additional optical detector (not shown), may be used as the reference signal for correlation detection. In this case, the intensity fluctuation component signal extracted from the light output of the semiconductor laser diode 68 may be used as the multiplicand signal for the multipliers 72 and 78. This arrangement is useful especially when the optical frequency modulation signal Sm causing optical intensity fluctuation or the electrical signal indicating optical intensity fluctuation is not obtained or difficult to obtain, and gives the same effects as the embodiment shown in FIG. 8.

Figure 12:
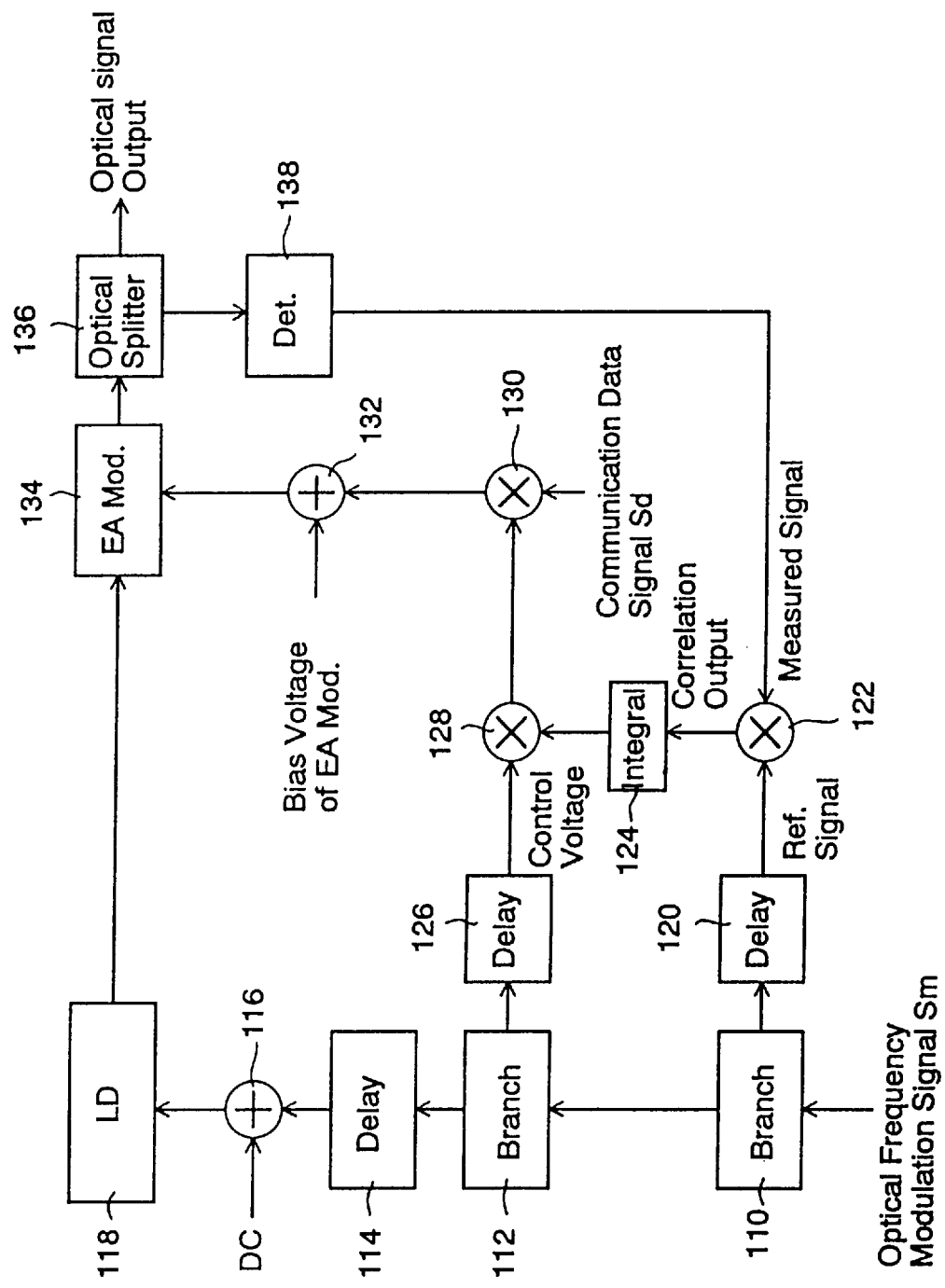
FIG. 12 is a block diagram showing a general construction of a fifth embodiment of the invention.

Next explained is a further embodiment modified from the embodiment shown in FIG. 8 so that a single electroabsorption modulator simultaneously executes both suppression of intensity fluctuation and modulation by the communication data signal Sd. FIG. 12 is a block diagram of a general construction of the modified embodiment.

In FIG. 12, the optical frequency modulation signal Sm is divided into two by a branch circuit 110, and one of outputs of the branch circuit 110 is again divided into two by a branch circuit 112. One of outputs of the branch circuit 112 is applied to an adder 116 through a delay circuit 114 having a predetermined amount of delay, and the other output of the branch circuit 112 is applied to a delay circuit 126. The adder 116 is also supplied with a d.c. voltage that causes continuous laser oscillation of a semiconductor laser diode 118, and adds the output voltage of the delay circuit 114 to the d.c. voltage. The adder 116 applies its output current to the semiconductor laser diode 118 to drive it. As a result, the semiconductor laser diode 118 is modulated both in optical frequency and in intensity by the optical frequency modulation signal Sm during continuous laser oscillation.

The other output of the branch circuit 110 is applied to one of inputs of a multiplier 122 via a delay circuit 120 having a predetermined amount of delay. The multiplier 122 is also supplied at its other input with a signal indicating residual components after suppression of intensity fluctuation of the light output from the semiconductor laser diode 118 (specifically, an output from an optical detector 138 explained later) to multiply both inputs and to detect correlation between them. That is, the output of the multiplier 122 indicates the correlation between the optical frequency modulation signal Sm and the residual components after intensity fluctuation suppression, and the multiplier 122 thus functions as a correlation detector.

Signals supplied from the branch circuits 110, 112 to the delay circuits 120, 126, respectively, are inverted in phase from signals input to the branch circuits 110, 112 if necessarily.

An integrating circuit 124 integrates the output of the multiplier 122, and applies its output to a multiplication factor control terminal of a multiplier 128. Fluctuation of the correlation rate is smoothed and integrated by the integrating circuit 124. Also applied to the multiplier 128 is the other output of the branch circuit 112 via a delay circuit 126 having a predetermined amount of delay. The multiplier 128 multiplies the output of the delay circuit 126 (a signal delayed from the optical frequency modulation signal Sm by the amount of delay of the delay circuit 126) by a factor of a magnitude determined by the voltage and the polarity of the output from the integrating circuit 124. More specifically, the multiplier 128 multiplies the output of the delay circuit 126 by a larger multiplication factor if the output voltage of the integrating circuit 124 is positive and large, or by a smaller multiplication factor if the output voltage of the integrating circuit 124 is negative and large. The multiplier 128 functions as amplitude adjusting means, and the integrating circuit 124 functions as amplitude control means for controlling the amplitude adjusting amount of the amplitude adjusting means (multiplier 128).

The multiplier 128 applies its output to one of inputs of a multiplier 130. The multiplier 130 is also supplied at its other input with the communication data signal Sd. The multiplier 130 issues a signal obtained by amplitude-modulating the communication data signal Sd with the output of the multiplier 128. An adder 132 adds to the output of the multiplier 130 a bias voltage that determines the operative point of an electroabsorption modulator 134. Functions of the multiplier 130 and the adder 132 are the same as those of the multiplier 42 and the adder 44 in FIG. 4. Here again, the communication data signal Sd is a voltage signal with two values in which +Va (volt) indicates "1" and −Va (volt) indicates "0".

The output voltage of the adder 132 is applied to a control terminal (cathode) of the electroabsorption modulator 134 which is also supplied with the light output from the semiconductor laser diode 118. The electroabsorption modulator 134 changes its transmissivity in response to the output voltage of the adder 132, and hence modulates the intensity of the light output of the laser diode 118 in accordance with the output voltage of the adder 132. The electroabsorption modulator 134 behaves in exactly the same manner as the electroabsorption modulator 46 in the embodiment shown in FIG. 4. That is, intensity fluctuation components contained in the light output of the laser diode 118 are suppressed by fluctuation in transmissivity of the electroabsorption modulator 134 due to frequency fluctuation components of the optical frequency modulation signal Sm on one side of the output of the adder 132 nearer to zero volt. Simultaneously, d.c. components in the light output of the laser diode 118 are intensity-modulated by components corresponding to the communication data signal Sd contained in the output of the adder 132.

In this manner, the light output from the electroabsorption modulator 134 is ON/OFF-modulated with the communication data signal Sd, and the intensity modulation components having been contained in the light output of the laser diode 118 by optical frequency modulation by the optical frequency modulation signal Sm is well-suppressed. Thus, a constant, stable extinction ratio can be obtained. Amounts of delay of the delay circuits 114, 120, 126 are previously determined so that the phase of intensity fluctuation of the light output from the laser diode 118 coincides with the phase of the fluctuation in transmissivity of the electroabsorption modulator 118 and that the correlation detection by the multiplier 122 and the amplitude adjustment by the multiplier 128 are optimized. It will be apparent that at least one of the delay circuits 114, 120, 126 can be omitted.

An optical splitter 136 splits the light output of the electroabsorption modulator 134 into two, and applies one of them to the optical detector 138 and the other to an optical transmission line such as optical fiber. The optical detector 138 converts an optical signal from the optical splitter 136 (optical signal output from the electroabsorption modulator 134) into an electric signal. The electric signal output from the optical detector 138 reflects the residual amount of intensity fluctuation suppression of the light output of the semiconductor laser diode 118 by the electroabsorption modulator 134 and the communication data signal Sd. Here is needed, however, only the residual amount of intensity fluctuation suppression of the light output from the semiconductor laser diode 118. Therefore, the optical detector 138 used here is a low-speed optical detector element independent from the frequency of the communication data signal Sd. Alternatively, a high-speed optical detector element may be used to extract from its output only frequency components of the optical frequency modulation signal Sm through a low pass filter or a band pass filter. By removing undesired components other than Sm, behaviors of the control system for optical intensity fluctuation suppression can be stabilized.

The optical detector 138 applies its output to the multiplier 122 which uses it for detecting correlation with the optical frequency modulation signal Sm as the multiplier 72 does. The amount of delay of the delay circuit 120 is previously determined to bring its output into the same phase with the output of the optical detector 138.

The loop made of the optical splitter 136, optical detector 138, multiplier 122, integrating circuit 124, multiplier 128, multiplier 130 and adder 132 controls the effect of intensity fluctuation suppression in the electroabsorption modulator 134 to minimize the residual fluctuation. This function is the same as the function of the control loop of the embodiment shown in FIG. 8 made of the optical splitter 84, optical detector 86, multiplier 72, integrating circuit 74, multiplier 78 and adder 80.

Although the embodiment shown in FIG. 12 uses the optical frequency modulation signal Sm itself as the reference signal for correlation detection by the multiplier 122, intensity fluctuation components in the light output from the semiconductor laser diode 68, which can be detected and extracted by an additional optical detector (not shown), may be used as the reference signal for correlation detection. In this case, the intensity fluctuation component signal extracted from the light output of the semiconductor laser diode 118 may be used as the multiplicand signal for the multiplier 128. This arrangement is useful especially when the optical frequency modulation signal Sm causing optical intensity fluctuation or the electrical signal indicating optical intensity fluctuation is not obtained or difficult to obtain, and gives the same effects as the embodiment shown in FIG. 12.

The embodiment shown in FIG. 12 uses a signal obtained by adjusting the optical frequency modulation signal Sm in phase and in amplitude to modulate the amplitude of the communication data signal Sd; however, the same effects can be obtained by adding both these signals. Namely, the multiplier 130 may be replaced by an adder. FIG. 13 is a block diagram of a general construction of an embodiment so modified. Elements common to those in FIG. 12 are labeled with common reference numerals.

An adder 140 adds to the output voltage of the multiplier 128 a bias voltage (for example, −Va (volt)) that determines the operative point of the electroabsorption modulator 134, and an adder 142 adds the communication data signal Sd to the output voltage of the adder 140. The output of the adder 142 is applied to the control terminal (cathode) of the electroabsorption modulator 134. The electroabsorption modulator 134 in the embodiment shown in FIG. 13 behaves in exactly the same manner as that of FIG. 12. The light output of the electroabsorption modulator 134 is ON/OFF-modulated by the communication data signal Sd, and the intensity modulation components having been contained in the light output of the laser diode 118 by optical frequency modulation by the optical frequency modulation signal Sm is suppressed.

The adder 140 (addition of the bias voltage) may be located at the output side of the adder 142. If a converter circuit for compensating the non-linearity of the electroabsorption modulator 134 is additionally connected at the output stage of the multiplier 128 or the adder 140 so as to compensate amplitude-change of the control signal (intensity fluctuation suppression control signal) of the electroabsorption modulator 134 such that the fluctuation in transmissivity of the electroabsorption optical modulator 134 matches the intensity fluctuation of the light output from the semiconductor laser diode 118, then the intensity fluctuation suppressing effect can be improved.

Although the foregoing explanation has been made as obtaining a laser light for communication, the laser light obtained by these embodiments can be used also for measurement. That is, the invention can provide a laser light that is modulated in optical frequency but maintains a constant optical intensity, and can be utilized in various fields using such a laser light.

Those skilled in the art will readily understand that the invention enables stable and effective suppression of intensity fluctuation caused by optical frequency modulation of a laser source. It also enables the use of higher frequencies for optical frequency modulation.

The invention can realize the intended device more economically than that attained by conventional devices using an optical fiber amplifier as taught by the Literature referred to above. Especially when the inventive device is used together with a modulator for modulating a data signal for communication or for measurement, optical signals with higher qualities can be obtained more economically.

Since the invention enables generation of optical carriers that are modulated in optical frequency but includes less or no optical intensity fluctuation or signals modulated by a data signal, it contributes to realization and long-distance applications of high-power optical transmission systems, such as, in particular, repeaterless optical transmission systems.

Devices according to the invention can apparently be used in various applications including measurement in addition to communication.

What is claimed is:

1. A laser light generator comprising:

a laser source driven for continuous laser oscillation by a drive signal superposed with an optical frequency modulation signal Sm; and optical intensity fluctuation suppressing means substantially responsive to said optical frequency modulation signal Sm for suppressing optical intensity fluctuation contained in an light output from said laser source.

2. The laser light generator according to claim 1 wherein said optical intensity fluctuation suppressing means includes:

phase/amplitude adjusting means for adjusting at least one of the phase and the amplitude of said optical frequency odulation signal Sm; and optical intensity control means responsive to an output signal from said phase/amplitude adjusting means for controlling the intensity of the light output of said laser source to thereby suppress optical intensity fluctuation contained in the light output of said laser source.

3. The laser light generator according to claim 2 wherein said optical intensity fluctuation suppressing means further includes:

residual fluctuation detecting means for detecting residual of optical intensity fluctuation components caused by said optical frequency modulation signal Sm from the light output of said optical intensity control means;

correlation detecting means for detecting correlation between an output signal from said residual fluctuation detecting means and said optical frequency modulation signal Sm; and amplitude control means responsive to a correlation rate detected by said correlation detecting means for controlling the quantity of amplitude adjustment by said phase/amplitude adjusting means.

4. The laser light generator according to claim 2 or 3 wherein said optical intensity control means comprises optical amplifier means controllable in amplification gain by an external control signal.

5. The laser light generator according to claim 2 or 3 wherein said optical intensity control means comprises light transmission means controllable in accordance with a attenuation factor by an external control signal.

6. The laser light generator according to claim 2 or 3 wherein said optical intensity control means comprises one selected from the group of a Mach-Zehnder interferometer-type modulator, optical filter, optical attenuator, semiconductor laser amplifier or optical fiber amplifier.

7. The laser light generator according to claim 1 further comprising optical modulator means for modulating the light output of said optical intensity fluctuation suppressing means with a data signal Sd.

8. A laser light generator comprising:

a laser source driven for continuous laser oscillation by a drive signal superposed with an optical frequency modulation signal Sm;

phase/amplitude adjusting means for adjusting at least one of the phase and the amplitude of said optical frequency modulation signal Sm;

composite means for compounding said optical frequency modulation signal Sm adjusted at least phase or amplitude by said phase/amplitude adjusting means with a data signal Sd;

optical modulating means for modulating the light output of said laser source in response to an output of said composite means, for thereby suppressing optical intensity fluctuation contained in the light output of said laser source, and for outputting an optical signal intensity-modulated by said data signal Sd.

9. The laser light generator according to claim 8, further comprising:

residual fluctuation detecting means for detecting residual of the optical intensity fluctuation components caused by said optical frequency modulation signal Sm from the light output of said optical modulator means;

correlation detecting means for detecting correlation between an output signal from said residual fluctuation detector means and said optical frequency modulation signal Sm; and amplitude control means responsive to a correlation rate detected by said correlation detecting means for controlling the quantity of amplitude adjustment by said phase/amplitude adjuster means.

10. The laser light generator according to claim 8 or 9 wherein said optical modulator means comprises optical amplifier means controllable in amplification gain by an external control signal.

11. The laser light generator according to claim 8 or 9 wherein said optical modulator means comprises light transmission means controllable in attenuation factor by an external control signal.

12. The laser light generator according to claim 8 or 9 wherein said optical modulator means comprises one selected from the group of a Mach-Zehnder interferometer-type modulator, optical filter, optical attenuator, semiconductor laser amplifier 11 or optical fiber amplifier.

13. The laser light generator according to claim 8 wherein said composite means includes:

multiplying means for multiplying the output signal from said phase/amplitude adjusting means by said data signal Sd; and adding means for adding to an output from said multiplying means a bias that determines the operative point of said optical modulating means.

14. The laser light generator according to one of claim 8 or 9, wherein said composite means comprises adding means for adding to an output signal from said phase/amplitude adjusting means a bias that determines the operative point of said optical modulating means and said data signal Sd.

* * * * *